Patented June 27, 1950

2,512,626

UNITED STATES PATENT OFFICE 2,512,626

PRODUCTION OF NITROGEN-CONTAINING POLYMERS

James Wotherspoon Fisher and Edward William Wheatley, Spondon, near Derby, England, assignors to Celanese Corporation of America, a corporation of Delaware No Drawing. Application January 25, 1947, Serial No. 724,476. In Great Britain February 7, 1946

6 Claims. (Cl. 260—2)

This invention relates to improvements in the production of polymeric materials and is more particularly concerned with the production of polymers suitable for the formation of films, filaments and plastic materials.

U. S. applications S. Nos. 662,628 and 609,031, filed April 16, 1946 and August 4, 1945 respectively describe the production of polymers containing the triazole ring or substitution products thereof, particularly amino substitution products, in the structural units. The polymers may be produced, for example, by heating dihydrazides of dicarboxylic acids or mixtures of diamides and dihydrazides of dicarboxylic acids, and by various other methods, details of which are given in the said applications. As stated therein, the presence of water during the condensation, particularly in the initial stages, is very beneficial, since it appears to prevent or retard a tendency for the polymer to become resinous and insoluble. As shown in the examples, by carrying out the polymerization in this manner, products having fibre-forming properties and intrinsic viscosities of, for example, 0.6 or 0.75 may be obtained.

The polymers produced in accordance with the applications set forth above contain structural units having the general formulae:

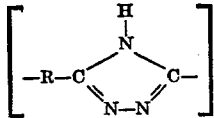

and

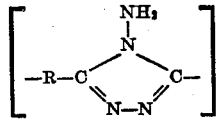

wherein R is a divalent organic radical free from reactive groups and having two terminal carbon atoms and is joined to the triazole rings through said terminal carbon atoms.

We have now discovered that fusible and soluble polymers produced according to the processes of U. S. applications S. Nos. 662,628 and 609,031, filed April 16, 1946 and August 4, 1945 respectively in the absence of organic diluents, especially polymers of intrinsic viscosity below about 0.45, e. g. about 0.3, may be modified by heating such polymers in a suitable organic liquid, preferably at a temperature between 200 and 300° C., for example 210 or 250° C. By the process of the present invention fusible and soluble polymers may be obtained which are particularly suitable for conversion into filaments, films and other shaped articles by a process involving the shaping and setting of solutions of the polymers. In general, the process serves to increase the intrinsic viscosity of the polymers; thus, for example, the viscosity of low polymers may be increased to 0.5, 0.8, 1.0 or more. The process also renders the polymers more readily soluble.

The time of heating in accordance with the present process will depend upon the reaction temperature employed and the degree of modification which is required and may, for instance, be 10 or 20 hours or more. If the period of heating is unduly long, however, the polymers tend to become infusible and insoluble, and heating should therefore be discontinued before such tendency develops. Heating should be carried out in the presence of nitrogen or other inert atmosphere. The organic liquids employed as diluents for the process may be non-solvents or solvents for the polymer, examples of such liquids being ethylene glycol, propylene glycol, glycerol and other polyhydroxy aliphatic compounds, phenol, the cresols, the xylenols and other phenolic compounds, and high-boiling hydrocarbon oils, for example oils having boiling points of 250 to 300° C. or more. In general it is preferred to use an amount of organic liquid equal to from 100 to 200% of the weight of the polymer.

When the desired degree of modification has been effected the reaction mass may be allowed to cool and the polymer then separated, if necessary after preliminary precipitation of the polymer, for example by mixing the mass with a liquid which is a non-solvent for the polymer and a solvent for the organic liquid employed as diluent during the reaction. The polymer may then be thoroughly washed and dried, after which it may be used for the production of films, filaments and other articles as described in the specifications referred to above, especially by shaping and setting solutions thereof in suitable solvents.

The following examples are given to illustrate the invention:

Example 1

10 parts by weight of polyaminotriazole having an intrinsic viscosity of 0.32 (prepared by heating 100 parts of sebacic dihydrazide and 20 parts of hydrazine hydrate for 2 hours at 220° C. and 2 hours at 250–260° C. in a nitrogen atmosphere), were heated with 10 parts by weight of ethylene glycol for 12 hours at 210° C. in an atmosphere of nitrogen. The polymer dissolved in the glycol and when heating was completed, was recovered by cooling the reaction mass and removing the glycol by extracting the mass with hot water and then with acetone. The polymer obtained had an intrinsic viscosity of 0.72 and very good fibre-forming properties, especially when spun from solutions, e. g. in cyanhydrins.

Example 2

10 parts by weight of the polyaminotriazole used in the previous example were heated with 20 parts by weight of omega oil (a high boiling paraffin) for 1 hour at 250° C. in a nitrogen atmosphere. The reaction mass was then allowed to cool and the polymer was separated from the oil in which it was insoluble. It had good fibre-forming properties, especially when spun from solutions, e. g. in cyanhydrins, and an intrinsic viscosity of 0.67.

Example 3

10 parts by weight of the polyaminotriazole used in Example 1, were heated with 10 parts of metacresol for 8 hours at 200°–210° C. in a nitrogen atmosphere. The polymer, which dissolved in the metacresol, was precipitated by pouring the solution into acetone. It had an intrinsic viscosity of 1.01 and was soluble in the cold in cyanhydrins such as acetaldehyde cyanhydrin. Its solutions gave clear films which were stronger and less brittle than those obtained from the untreated polyaminotriazole. The films could be dyed with dispersions of water-insoluble dyestuffs having an affinity for cellulose acetate, for example 1-amino-4-hydroxy anthraquinone, either by including the dyestuff in the film-forming solution or by treatment of the formed film in an aqueous dye bath.

Example 4

20 parts by weight of polyaminotriazole having an intrinsic viscosity of 0.33 (prepared by heating adipic dihydrazide with half its weight of 50% aqueous hydrazine hydrate for 2 hours at 220° C. under a pressure above 500 lbs./sq. in., and then for 1 hour at 220° C. under a pressure of 300 lbs./sq. in.), was heated with 20.7 parts of m-cresol for 6 hours at 210° C. in a nitrogen atmosphere. The polymer formed a viscous solution in the m-cresol, and was precipitated therefrom as a fibrous, white solid by pouring into excess acetone. The product had an intrinsic viscosity of 0.52, and had good fibre-forming properties, especially when spun from solutions, e. g. in cyanhydrins.

Having described our invention, what we desire to secure by Letters Patent is:

1. Process for the modification of fusible soluble linear preformed polymers produced in the absence of organic diluents, said polymers having an intrinsic viscosity below about 0.45 and consisting of structural units selected from the group consisting of

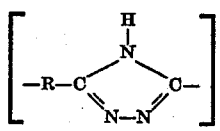

and

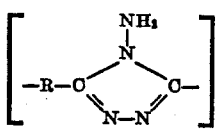

wherein R is a divalent organic radical free from reactive groups and having two terminal carbon atoms and is joined to the triazole rings through said terminal carbon atoms, which comprises heating said polymers in an inert organic liquid diluent until the polymers have an intrinsic viscosity above about 0.5 and discontinuing the heating while the polymers remain fusible and soluble.

2. Process for the modification of fusible soluble linear preformed polymers produced in the absence of organic diluents, said polymers having an intrinsic viscosity below about 0.45 and consisting of structural units selected from the group consisting of

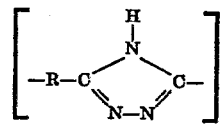

and

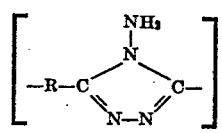

wherein R is a divalent organic radical free from reactive groups and having two terminal carbon atoms and is joined to the triazole rings through said terminal carbon atoms, which comprises heating said polymers at 200–300° C. in an inert organic liquid diluent until the polymers have an intrinsic viscosity above about 0.5 and discontinuing the heating while the polymers remain fusible and soluble.

3. Process for the modification of fusible soluble linear preformed polymers produced in the absence of organic diluents, said polymers having an intrinsic viscosity below about 0.45 and consisting of structural units selected from the group consisting of

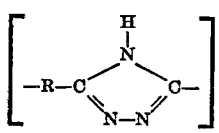

and

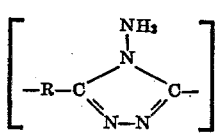

wherein R is a divalent organic radical free from reactive groups and having two terminal carbon atoms and is joined to the triazole rings through said terminal carbon atoms, which comprises heating said polymers at 200–300° C. in an inert organic solvent diluent for the polymers until the polymers have an intrinsic viscosity above about 0.5 and discontinuing the heating while the polymers remain fusible and soluble.

4. Process for the modification of fusible soluble linear preformed polymers produced in the absence of organic diluents, said polymers having an intrinsic viscosity below about 0.45 and consisting of structural units selected from the group consisting of

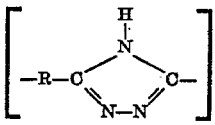

and

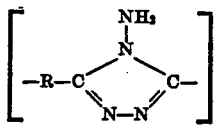

wherein R is a divalent organic radical free from reactive groups and having two terminal carbon atoms and is joined to the triazole rings through said terminal carbon atoms, which comprises heating said polymers at 200–300° C. in phenol until the polymers have an intrinsic viscosity above about 0.5 and discontinuing the heating while the polymers remain fusible and soluble.

5. Process for the modification of fusible soluble linear preformed polymers produced in the absence of organic diluents, said polymers having an intrinsic viscosity below about 0.45 and consisting of structural units of the general formula

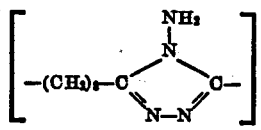

which comprises heating said polymers in an inert organic liquid diluent until the polymers have an intrinsic viscosity above about 0.5 and discontinuing the heating while the polymers remain fusible and soluble.

6. Process for the modification of fusible soluble linear preformed polymers produced in the absence of organic diluents, said polymers having an intrinsic viscosity below about 0.45 and consisting of structural units of the general formula

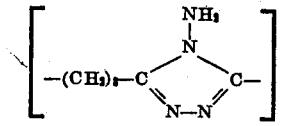

which comprises heating said polymers at a temperature of 200–300° C. in phenol until the polymers have an intrinsic viscosity above about 0.5 and discontinuing the heating while the polymers remain fusible and soluble.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,218,077 | Zerweck | Oct. 15, 1940 |
| 2,332,303 | D'Alelio | Oct. 19, 1943 |
| 2,349,979 | Moldenhauer | May 30, 1944 |
| 2,395,642 | Prichard | Feb. 26, 1946 |